(12) United States Patent
Wilson

(10) Patent No.: US 8,534,230 B2
(45) Date of Patent: Sep. 17, 2013

(54) PORTABLE CORRAL

(76) Inventor: Robert L. Wilson, Cherokee, OK (US)

( * ) Notice: Subject to any disclaimer, the term of this patent is extended or adjusted under 35 U.S.C. 154(b) by 117 days.

(21) Appl. No.: 12/946,848

(22) Filed: Nov. 15, 2010

(65) Prior Publication Data

US 2011/0120384 A1     May 26, 2011

Related U.S. Application Data

(60) Provisional application No. 61/263,766, filed on Nov. 23, 2009.

(51) Int. Cl.
*A01K 1/00* (2006.01)
(52) U.S. Cl.
USPC ............................................ 119/519; 119/516
(58) Field of Classification Search
USPC ............................ 119/512–514, 516, 519, 522
See application file for complete search history.

(56) References Cited

U.S. PATENT DOCUMENTS

| | | | |
|---|---|---|---|
| 3,989,270 A | 11/1976 | Henderson |
| 4,013,303 A | 3/1977 | Milner |
| 4,077,649 A | 3/1978 | Hawk |
| 4,090,472 A | 5/1978 | York |
| 4,250,836 A | 2/1981 | Smith |
| 4,341,181 A | 7/1982 | Fair |
| 4,723,788 A | 2/1988 | Suter |
| 4,960,074 A | 10/1990 | Wilson |
| RE33,959 E | 6/1992 | Mollhagen |
| 5,237,960 A | 8/1993 | Wilson |
| 5,342,076 A | 8/1994 | Swindall |
| 5,381,757 A | 1/1995 | Putney |
| 5,482,309 A | 1/1996 | Hollis |
| 5,797,614 A | 8/1998 | Hord et al. |
| 6,067,940 A | 5/2000 | Holder |
| 6,450,123 B1 | 9/2002 | Murray et al. |
| 6,450,124 B1 | 9/2002 | Calvert et al. |
| 6,499,435 B2 | 12/2002 | Markham |
| 6,764,092 B1 | 7/2004 | Greaves |
| 6,854,426 B2 | 2/2005 | Campbell et al. |
| 6,868,804 B1 | 3/2005 | Huisma |
| 7,146,933 B1 | 12/2006 | Dubas |
| 7,216,605 B2 | 5/2007 | Cupps |
| 7,325,513 B1 | 2/2008 | Velasquez |
| 7,389,746 B2 | 6/2008 | Byl et al. |
| 2009/0064941 A1 | 3/2009 | Daniels |

*Primary Examiner* — Kristen C Hayes
(74) *Attorney, Agent, or Firm* — Martin S. High, P.C.

(57) ABSTRACT

Ranchers and other owners of livestock commonly have a need for a transportable means of setting up a corral for numerous purposes. Sorting must take place in a remote location or a location without a permanent corral, which are prohibitively time consuming and expensive to build. A preferred embodiment of the Portable Corral is comprised of a central chute, a left corral area, and a right corral area. The central chute is comprised of a back chute, a front chute, a left central chute panel and a right central chute panel. The front chute is comprised of a breakaway hitch that in turn is comprised of a left breakaway hitch section and a right breakaway hitch section. The left and right breakaway hitch sections are collapsed together to comprise the breakaway hitch used to connect to the towing vehicle.

11 Claims, 13 Drawing Sheets

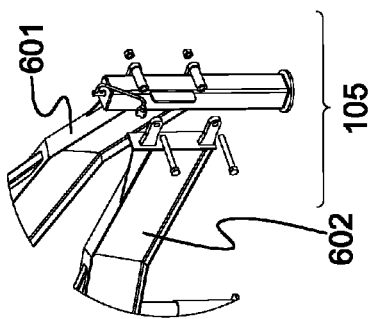
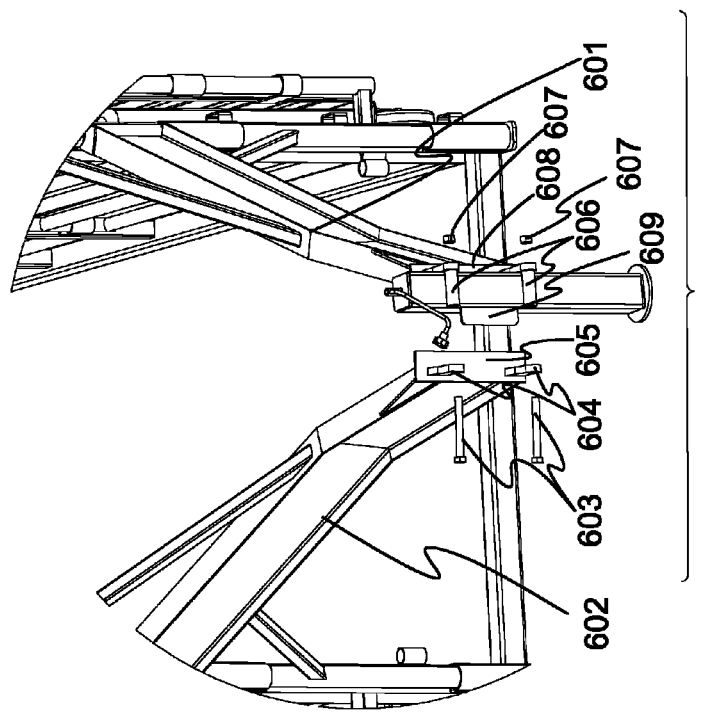
FIG 6A

US 8,534,230 B2

PORTABLE CORRAL

CROSS-REFERENCE TO RELATED APPLICATIONS

This application claims priority of the provisional application with Ser. No. 61/263,766 titled "Portable Corral" filed on Nov. 23, 2009. The entire contents of provisional application 61/263,766 are herein incorporated by reference.

STATEMENT REGARDING FEDERALLY SPONSORED RESEARCH OR DEVELOPMENT

Not applicable.

FIELD OF THE EMBODIMENTS

The field of the embodiments is transportable livestock corrals.

BACKGROUND OF THE EMBODIMENTS

Ranchers and other owners of livestock commonly have a need for a may need to sort the livestock for veterinary procedures, to sort by gender, or for marketing purposes. Many times this sorting must take place in a remote location or a location without a permanent corral. Building corrals in such locations is prohibitively time consuming and expensive. Therefore, a corral that is both portable and that serves the various sorting needs of a livestock owner is of great value.

SUMMARY OF THE EMBODIMENTS

The Portable Corral is comprised of an entrance chute, a rear-wheel assembly, a central chute, a left foldable corral, a right foldable corral, a breakaway hitch, and an exit chute. The entrance chute is comprised of two or more fence panels that are attached to the rear of the central chute. The fence panels are constructed so that livestock cannot walk or crawl through opening of the fence panel. That is, the livestock are contained by the panels when one or more panels are arranged in the form of a gate, chute, alleyway or corral. The Portable Corral is comprised of numerous fence panels of different lengths and heights depending on their position in the Portable Corral.

The purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. Neither this summary nor the abstract is intended to define the invention of the application which is measured by the claims, nor is it intended to be limiting as to the scope of the invention in any way.

BRIEF DESCRIPTION OF THE DRAWINGS

FIG. 6A is a perspective view of the breakaway hitch in the unmatched orientation; FIG. 6B is a perspective view of the breakaway hitch in the matched orientation.

DETAILED DESCRIPTION OF THE PREFERRED EMBODIMENTS

Figure 1:
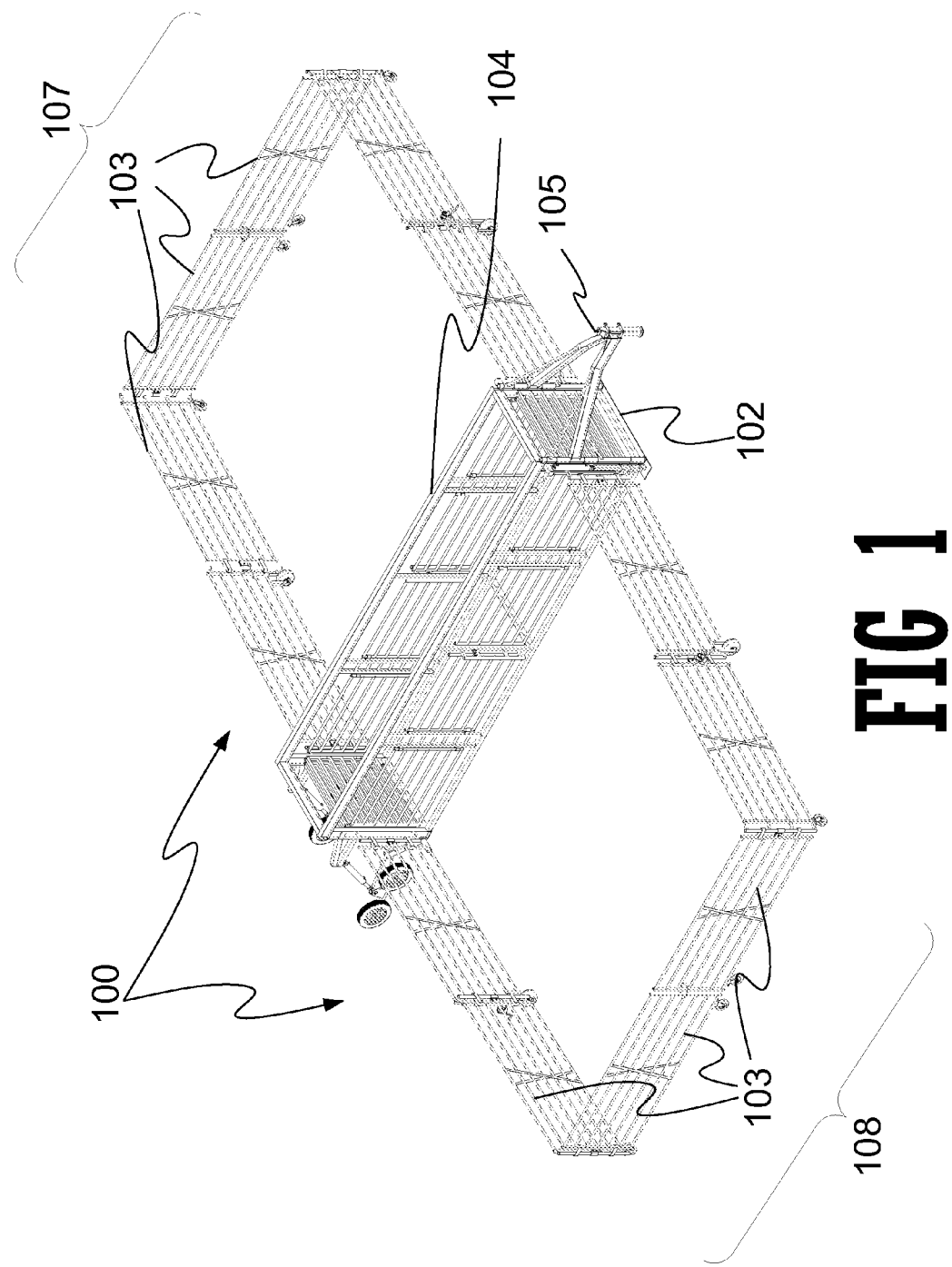
FIG. 1 is a perspective view of an embodiment of the Portable Corral in the expanded orientation.

The Portable Corral 100 is comprised of an entrance chute 401, a rear-wheel assembly 201, a central chute 104, a left foldable corral 107, a right foldable corral 108, a breakaway hitch 105, and an exit chute 404. In describing the embodiments of the Portable Corral 100, the terms "left" and "right" are used relative to the central chute 104 as viewed from the rear of the Portable Corral 100 looking from the rear-wheel assembly 201 towards the front of the Portable Corral 100 towards the breakaway hitch 105. A preferred embodiment of the Portable Corral 100 in the unfolded position is shown in FIG. 1.

The entrance chute 401 is comprised of two or more fence panels 103 that are attached to the rear of the central chute 104. The term "fence panels," or more simply "panels," means a rectangular panel constructed from tubular steel or sheet steel members that form a single fence unit or fence panel. The fence panels are constructed so that livestock cannot walk or crawl through opening of the fence panel. That is, the livestock are contained by the panels when one or more panels are arranged in the form of a gate, chute, alleyway or corral. The Portable Corral 100 is comprised of numerous fence panels 103 of different lengths and heights depending on their position in the Portable Corral 100.

In preferred embodiments of the Portable Corral 100, the entrance chute 401 is comprised of four fence panels 103 with two fence panels 103 attached to the left side of the rear of the central chute 104 and two panels 103 attached to the right side of the central chute assembly. These rear panels 103 are hinged so that either the right or left side can fold up and be secured to the rear of the central chute assembly. Further, the second side can be folded and arranged flush against the folded first side and also be secured to the central chute assembly. The second rear panel side has a slightly extended hinge assembly to accommodate the width of the folded second side.

The rear wheel assembly 201 is comprised of a under-slung torsion tube 801 and a plurality of rubber wheels 202 to support the Portable Corral 100 when being transported and allows the Portable Corral 100 to be transported. The under-slung torsion tube 801 is comprised of a steel tube that is attached to the wheel frame 802 on each side of the rear wheel assembly 201. The wheel frame 802 is in turn attached to the one or more rubber wheels 202 on each side of the wheel frame 802. The under-slung torsion tube 801 serves to provide a mechanical connection and communication between the two sides of the rear wheel assembly 201. The under-slung torsion tube 801 serves to maintain stability of the Portable Corral 100 as the corral is transported over rough terrain.

In one embodiment of the Portable Corral 100, where this embodiment of the Portable Corral involves extra weight due to the application required for the embodiment, the rear wheel assembly is comprised of a pair of walking beams 203. One walking beam 203 is positioned the left side of the entrance chute 401 and one walking beam 203 is positioned on the right side of the entrance chute 401. Each walking beam 203 is comprised of two rubber wheels 202. The total of four rubber wheels 202 allows for the transportation of the entire Portable Corral 100 unit when the Portable Corral 100 is in the transportation configuration. The walking beams 203 allow the Portable Corral 100 to be transported over the rough terrain that is to be anticipated in the various common applications of the Portable Corral 100. The walking beams 203 operate by allowing the rubber wheels 202 to independently move over rough terrain. The walking beams 203 pivot at a point equidistant between the axels of the two rubber wheels 202 on each side of the Portable Corral 100.

Figure 10:
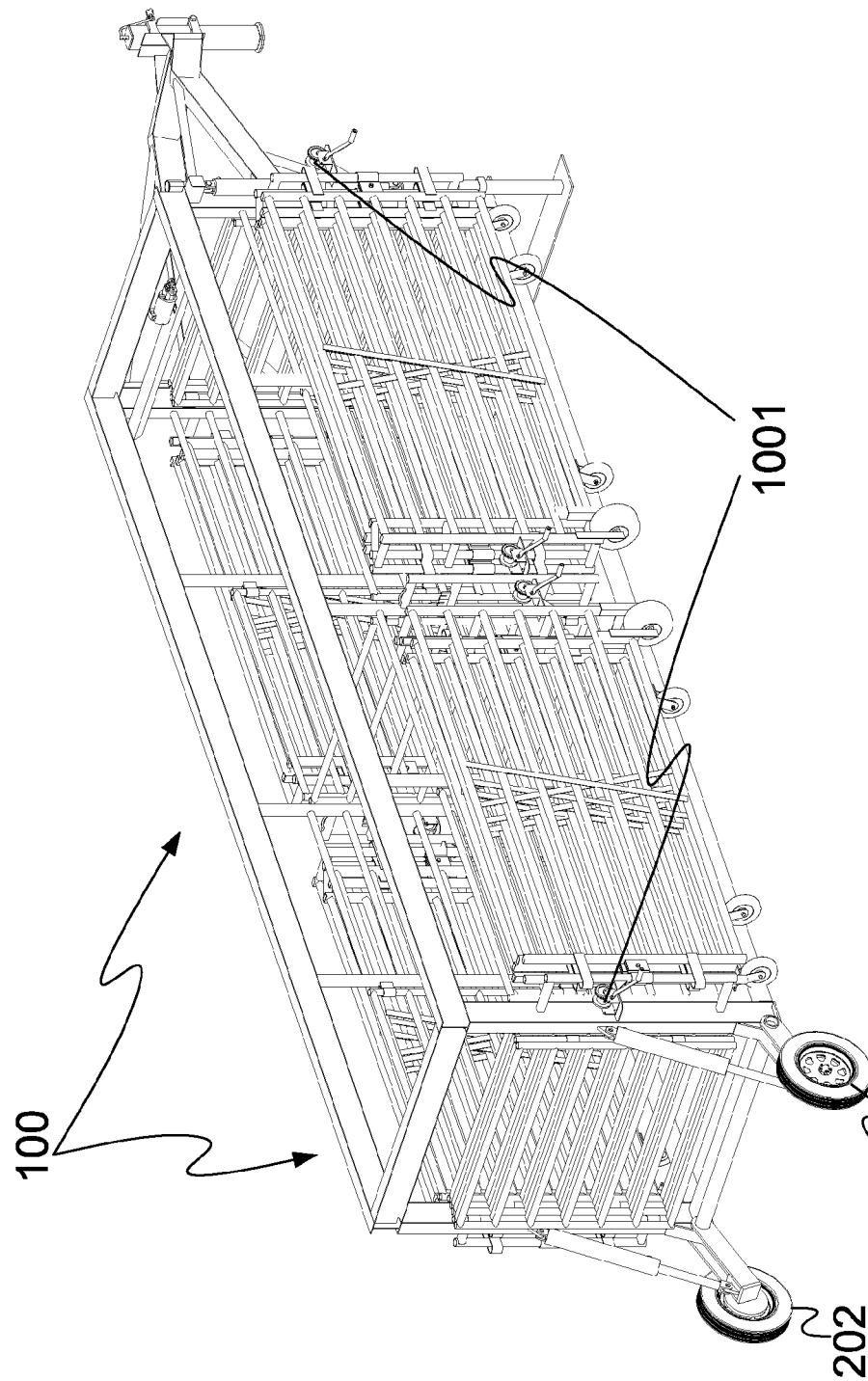
FIG. 10 is a perspective view of the rear-wheel assembly in the transport configuration of an embodiment of the Portable Corral with eight fence panels on each side.
Figure 11C:
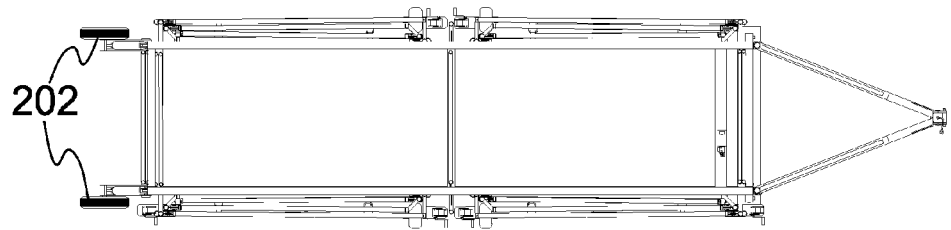
FIG. 11c is a top view of an embodiment of the Portable Corral with eight fence panels.
Figure 11B:
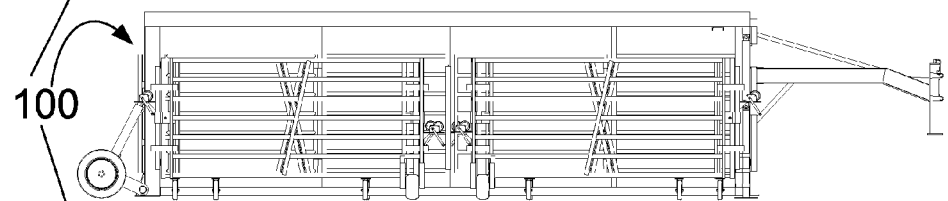
FIG. 11B is a side view of an embodiment of the Portable Corral with eight fence panels on each side with the rear lifting cylinders and front lift in the raised position for the transportation configuration.
Figure 11A:
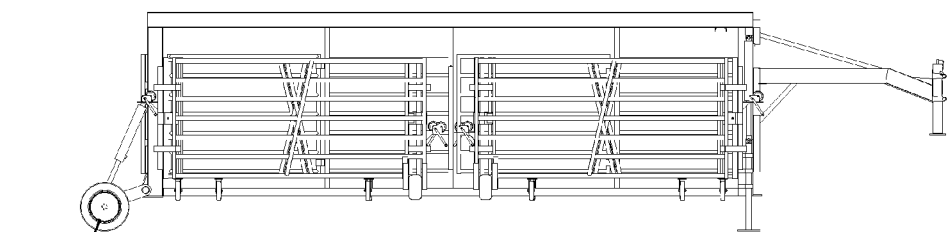
FIG. 11A is a side view of an embodiment of the Portable Corral with eight fence panels on each side with the rear lifting cylinders and front lift in the extended position for the parked configuration.

In another embodiment of the Portable Corral 100, where this embodiment of the Portable Corral involves a lighter weight, the rear wheel assembly is comprised of a pair of rubber wheels 202. In this embodiment, one rubber wheel on each side of the rear end of the portable corral, where the rubber wheels are attached to the bottom of the central frame via a rear wheel frame 802 and to the upper portion of the central frame via a rear lifting cylinders 803 on each side of the portable corral. In this embodiment, no walking beam is present, as shown in FIGS. 10 and 11. In this embodiment, the unit is sufficiently light, due to the decrease in length of the overall unit, to not require a walking beam to traverse uneven terrain.

The central chute 104 is comprised of a central chute frame, a plurality of alleyway gates, a pair of rear lifting cylinders 803, a front lift 102, a hydraulic pump 301, a solar panel and battery 302, a plurality of panels 103. The central chute 104 acts as the main structural and support assembly when the Portable Corral 100 is being transported and provides the support for all of the elements of the Portable Corral 100. The central chute 104 is comprised of four main corner horizontal structural beams, four main corner vertical structural beams, and a plurality of horizontal, vertical and diagonal support members. The central chute 104 serves as the central livestock herding corridor when the Portable Corral 100 is in the deployed mode. In one embodiment, the plurality of alleyway gates are comprised of a rear alleyway gate 402 and a front alleyway gate 403.

Figure 9B:
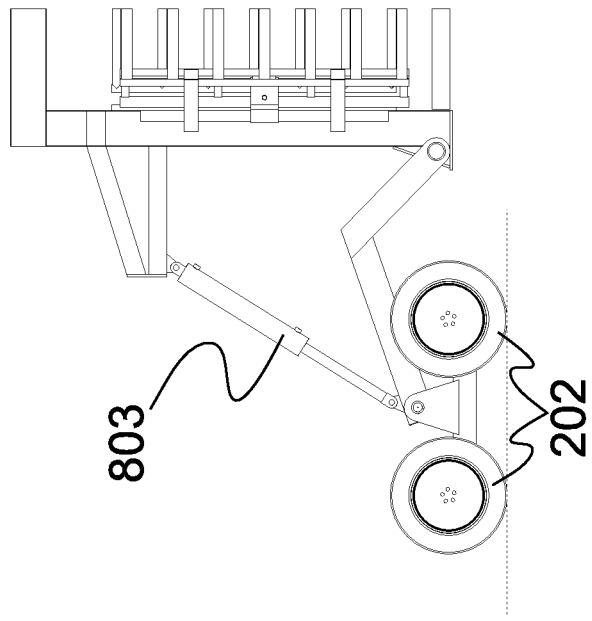
FIG. 9B is a perspective view of the rear-wheel assembly in the transportation configuration of an embodiment of the Portable Corral.
Figure 9A:
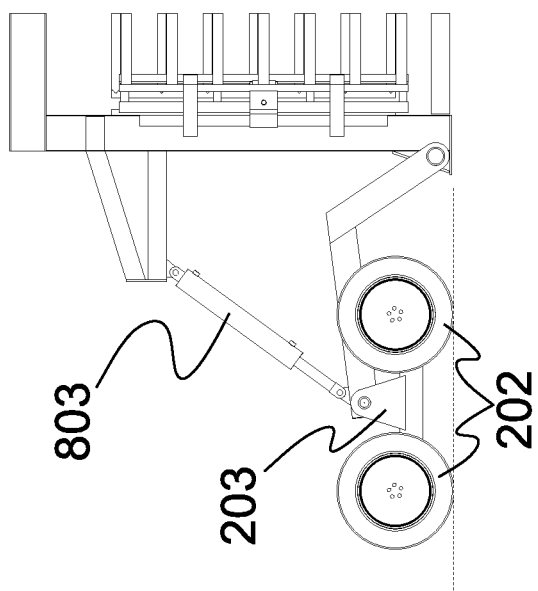
FIG. 9A is a perspective view of the rear-wheel assembly in the deployed or ground configuration of an embodiment of the Portable Corral.

When the Portable Corral 100 is in the transportation configuration, as shown in FIG. 9b, the rear lifting cylinders 803 are extended, raising the rear of the central chute 104 off of the ground. Also in the transportation configuration, the front lift 102 is raised allowing the front of the central chute to clear the ground. In the transportation mode, the breakaway hitch 105 is in the closed configuration allowing engagement with a towing vehicle. The solar panel and battery 302 provide a means of supplying electrical power to the hydraulic pump 301. The hydraulic pump 301 provides hydraulic power to the rear lifting cylinders 803 and the front lift 102. The ability to raise and lower the Portable Corral 100 allows the entire unit to rest on the ground in the deployed configuration. Resting on the ground provides enhanced stability required for a variety of terrain conditions. It is important to note that the Portable Corral 100 can be rested squarely on the ground. This provides enhanced stability of the Portable Corral 100 over other designs that remain removed from the ground or on wheels while those corral designs are in use. When in use, the Portable Corral 100 is firmly anchored to the ground.

The front chute is comprised of a breakaway hitch 105. The breakaway hitch 105 forms a gooseneck-type hitch to engage with "fifth-wheel" type hitch connects and tractor-trailer type hitch connections. The breakaway hitch 105 is comprised of a left breakaway hitch section 601 and a right breakaway hitch section 602. The left 601 and right 602 breakaway hitch sections are collapsed together to comprise the breakaway hitch 105 when the Portable Corral 100 is folded in the transportation configuration. The breakaway hitch 105 is then used to connect to the towing vehicle.

The sections of the breakaway hitch 105 engage to form a gooseneck-type hitch when the left breakaway hitch section 601 is engaged with the right breakaway hitch section 602. The left 601 and right 602 breakaway hitch sections are engaged and secured via two bolts 603 which are inserted through two bolt guides 606. The bolts are secured with two nuts 607. As the left 601 and right 602 breakaway hitch sections are secured by two guide posts 604 engaging with a guide plate 609. Engaging the guide posts 604 with the guide plat 609 provides stability to the entire breakaway hitch 105 by limiting rolling action of the two sides of the corral. Further, a left support plate 608 and a right support plate 605 are butted and secured against each other when the left 601 and right 602 breakaway hitch sections are joined and secured by the bolts 603 and nuts 607. The joined left 608 and right 605 support plates limit the side-to-side motion of the entire portable corral 100 while the breakaway hitch 105 is engaged and the portable corral 100 is being transported.

Figure 13:
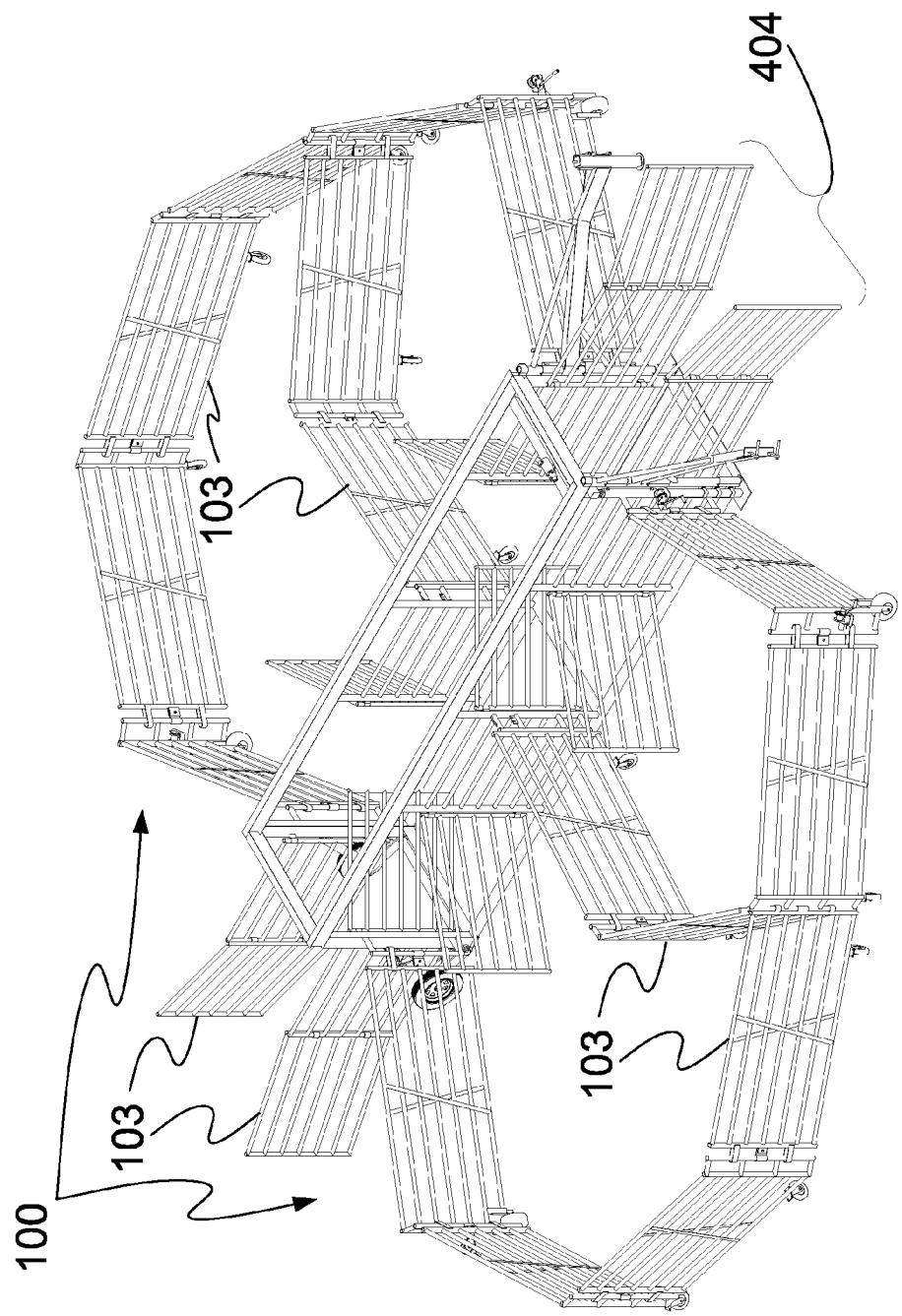
FIG. 13 is a perspective view of an embodiment of the Portable Corral with eight fence panels on each side showing the sub-corrals for both the left foldable corral 107 and right foldable corral 108 forming two distinct sub-corrals.

The left foldable corral 107 is further comprised of two sub corral areas and the right foldable corral 108 is further comprised of two sub-corral areas as shown in FIG. 13. The left corral area is attached to the left central chute panel and the right corral area is attached to the right chute panel. The left and right corral areas are further comprised of a plurality of corral panels 103. A winch 1001 is affixed to both sub-corral areas on both the left foldable corral 107 and right foldable corral 108 for a total of four winches, two on the left foldable corral 107 and two on the foldable corral 108. The winches are used to raise the left and right corral areas off the ground and to place the Portable Corral 100 in the transportation mode. The outside panels of the sub-corrals are shorter due than the inside panels to the length of main frame. The outside panels are affixed to a vertical I-beam in the corner of the central chute 104 and the front and rear of the Portable Corral 100.

The rear lifting cylinders 803 in the rear of the embodiments and the front lift 102 in the front of the embodiments permit the embodiments to be raised and lowered. When the embodiments are raised (the rear lifting cylinders 803 and the front lift 102 are extended) the embodiments are placed in the transportation configuration Once the towing vehicle is hitched to the embodiments, the front lift 102 is retracted an the embodiments can be towed. For deployed configuration from being towed, the front lift 102 is first extended so the towing vehicle can be unhitched. Then the rear lifting cylinders 803 and the front lift 102 are retracted allowing the embodiments to rest on the ground.

Figure 5:
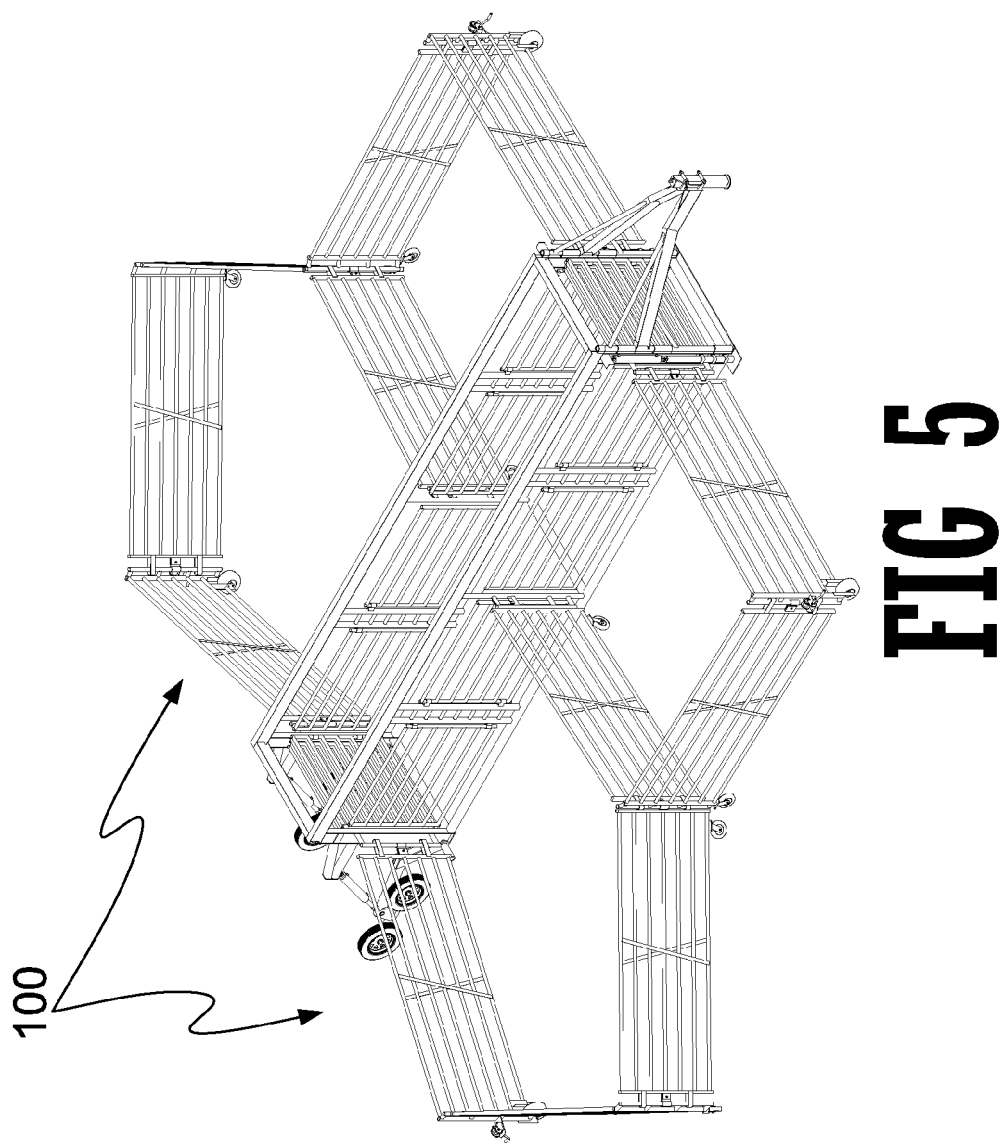
FIG. 5 is a perspective an embodiment of the Portable Corral in the expanded orientation showing one configuration of the left corral and right corral and associated sub-corrals.
Figure 7A:
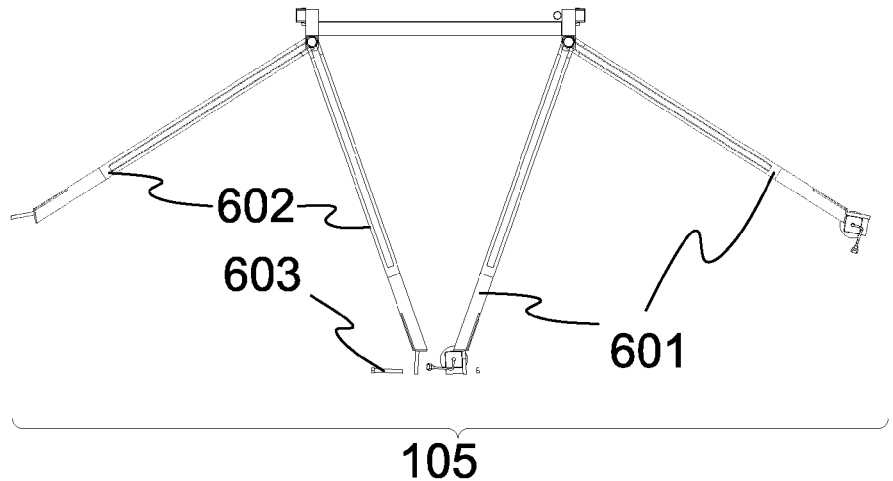
FIG. 7A is a top view of the breakaway hitch in the unmatched orientation.
Figure 7B:
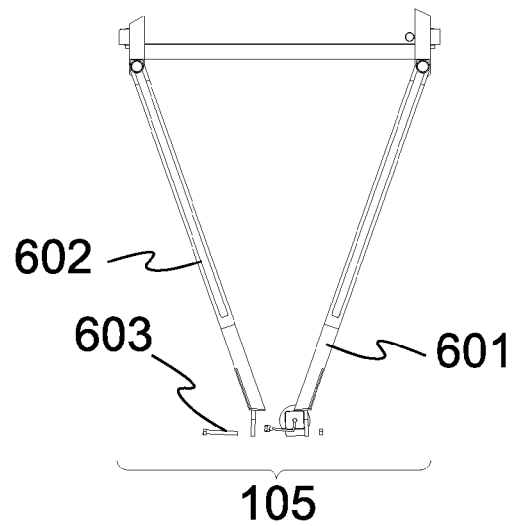
FIG. 7B is a top view of the breakaway hitch in the matched orientation.
Figure 8:
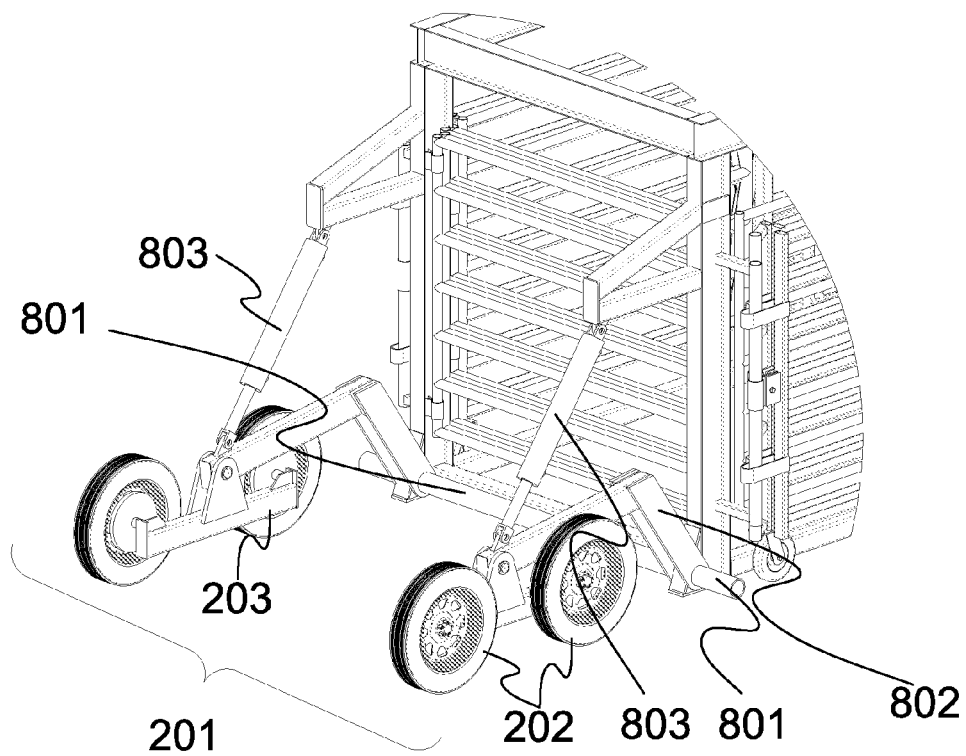
FIG. 8 is a perspective view of the rear-wheel assembly of an embodiment of the Portable Corral.
Figure 12:
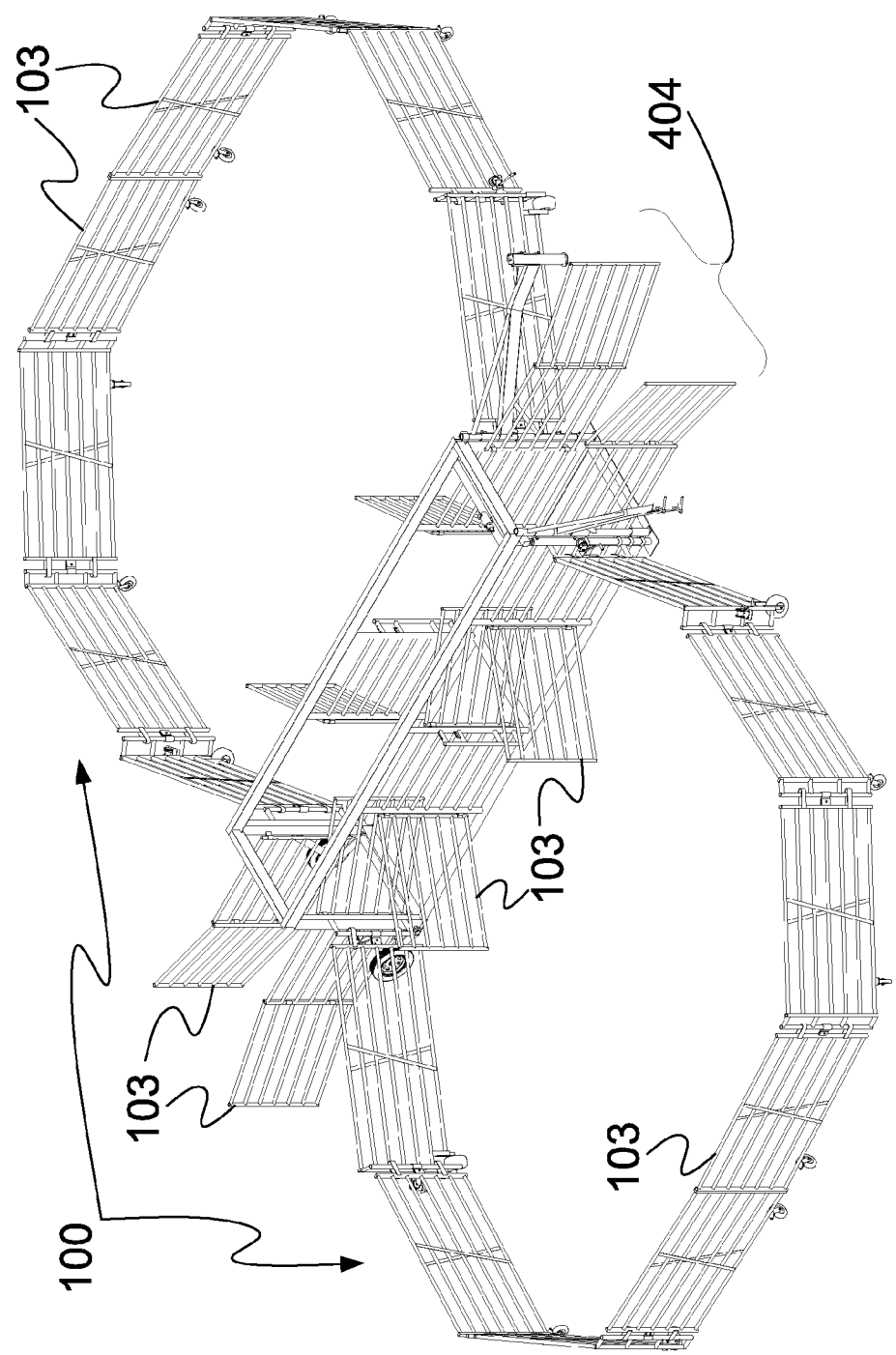
FIG. 12 is a perspective view of an embodiment of the Portable Corral with eight fence panels on each side showing the sub-corrals for both the left foldable corral 107 and right foldable corral 108 forming one large sub-corral on both the left and right sides.

The left foldable corral 107 and right foldable corral 108 are each comprised of a plurality of fence panels. In one embodiment of the Portable Corral 100, the left foldable corral 107 and right foldable corral 108 are each comprised of six fence panels—three fence panels in each sub-corral as shown in FIG. 5. In another embodiment of the Portable Corral 100, the left foldable corral 107 and right foldable corral 108 are each comprised of eight (8) fence panels—four fence panels in each sub-corral as shown in FIG. 12. In the eight panel embodiment, the fence panels are shorter than the panels in the six panel embodiment. In this manner, the eight panel embodiment can fold to a shorter transportation configuration yet maintain equivalent sized side corrals to the longer embodiment of the Portable Corral. The fence panels in the sub-corrals may be arranged in a variety of configurations depending on the application of the Portable Corral 100. For example, FIG. 1 shows six (6) fence panels in the sub-corrals for both the left foldable corral 107 and right foldable corral 108 connected in a basic large square configuration. Whereas, in FIG. 5, shows six (6) fence panels in the sub-corrals for both the left foldable corral 107 and right foldable corral 108 forming a two distinct sub-corrals. Analogously, FIG. 13 shows eight (8) fence panels in the sub-corrals for both the left foldable corral 107 and right foldable corral 108 connected in essentially a large oval configuration. Whereas, in FIG. 14 shows eight (8) fence panels in the sub-corrals for both the left foldable corral 107 and right foldable corral 108 forming a two distinct sub-corrals.

The left foldable corral 107 and right foldable corral 108 are comprised of a plurality of small casters 303 and a plurality of large casters 304. These casters are affixed to the bottom of the fence panels. The small casters 303 and large casters 304 allow for movement of the fence panels into various configurations.

Figure 2:
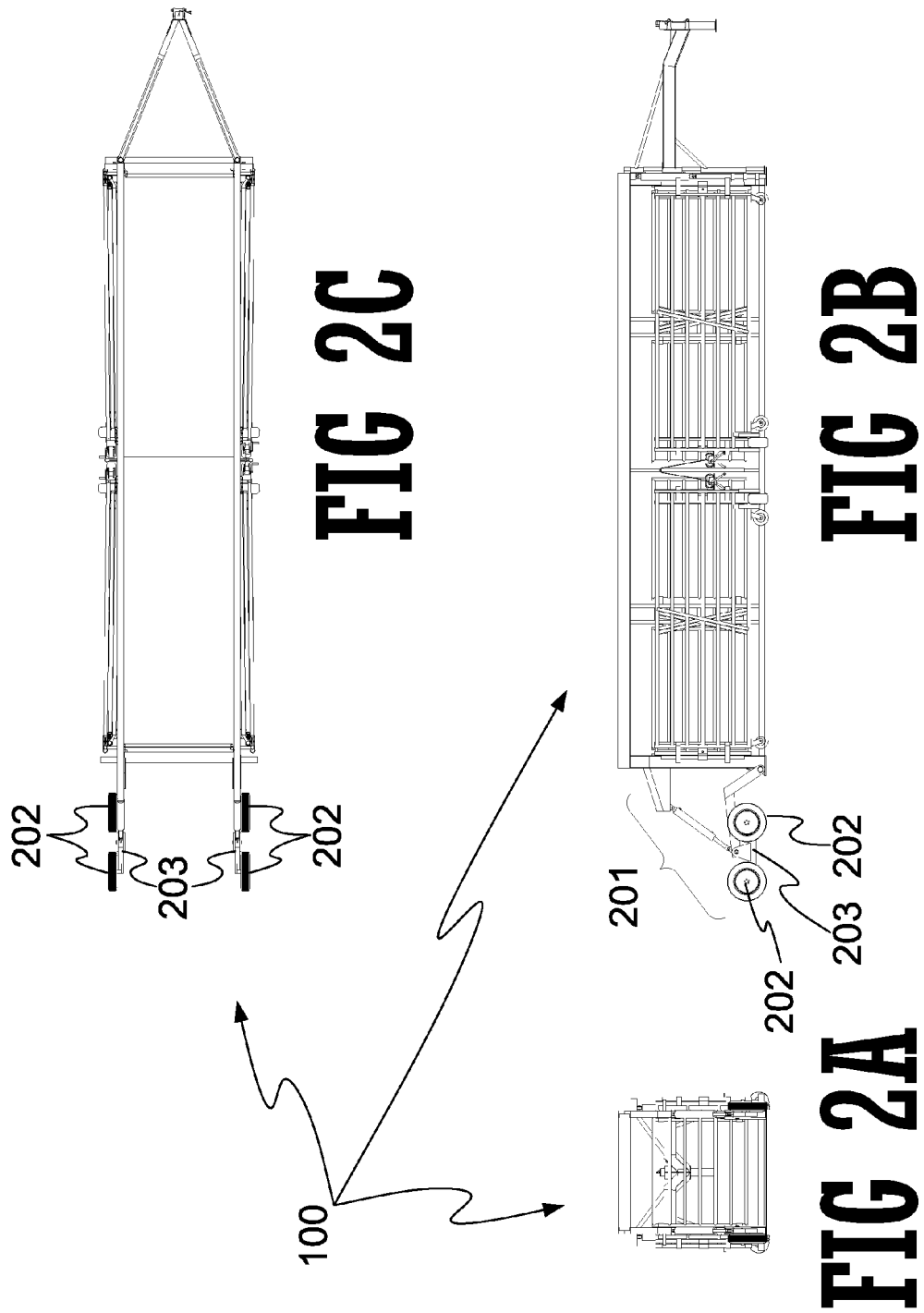
FIG. 2A is a back view an embodiment of the Portable Corral in the transportable orientation.
FIG. 2B is a right side view an embodiment of the Portable Corral in the transportable orientation.
FIG. 2C is a top view an embodiment of the Portable Corral in the transportable orientation.

An embodiment of the portable corral can be folded into a transportation configuration as shown in FIG. 2. In this configuration, the right corral area folds into a flat position and is attached to the right central chute panel. In addition, the left corral area folds flat against the central chute into a transportation configuration against the left central chute panel. In addition, the back chute is folded into a transportation configuration against the rear portion of the central chute. The right breakaway hitch section and the left breakaway hitch section are folded to form a receiver hitch that is connected to the towing vehicle.

Figure 3:
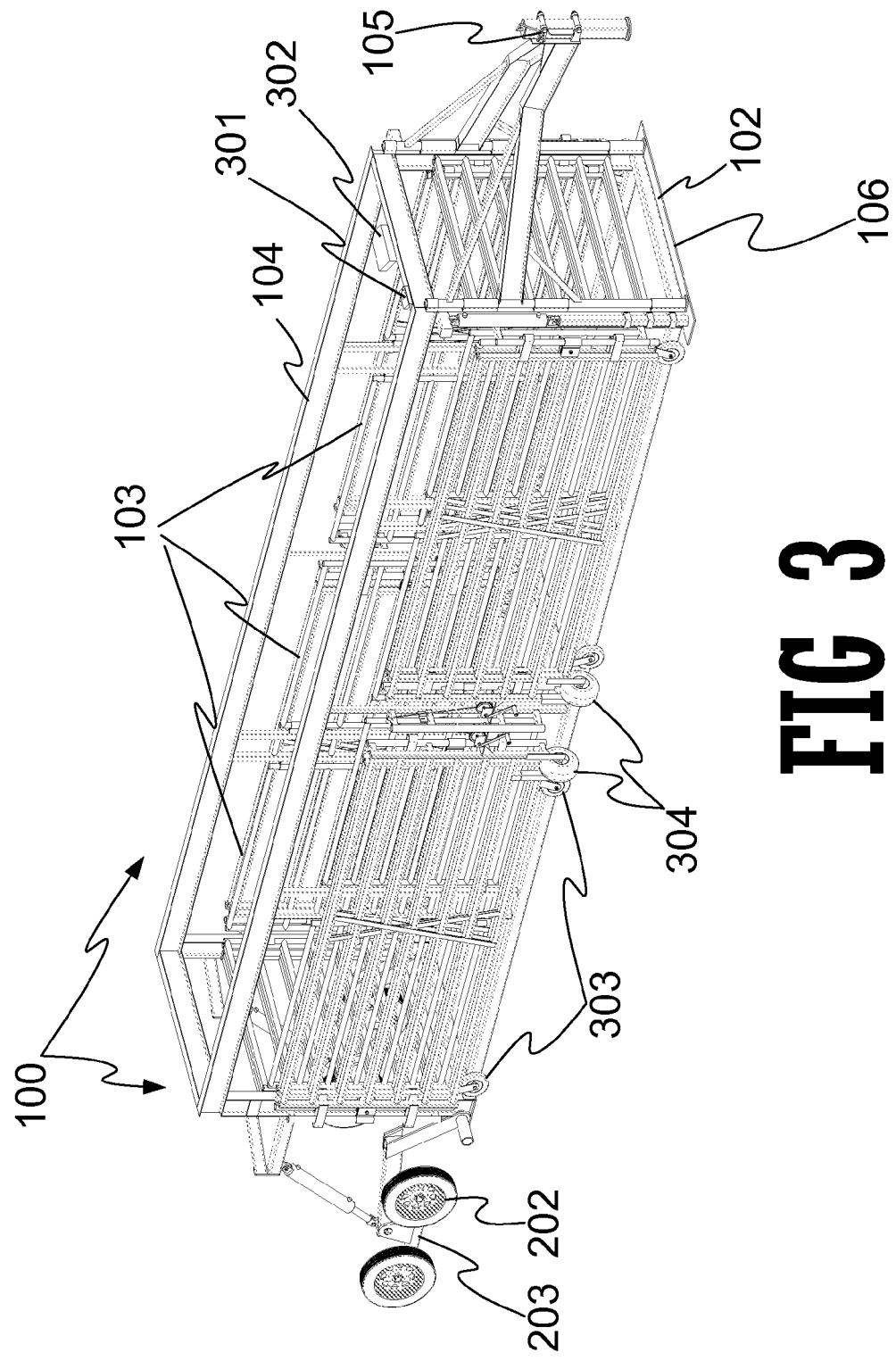
FIG. 3 is a perspective view an embodiment of the Portable Corral as viewed resting on the ground.
Figure 4:
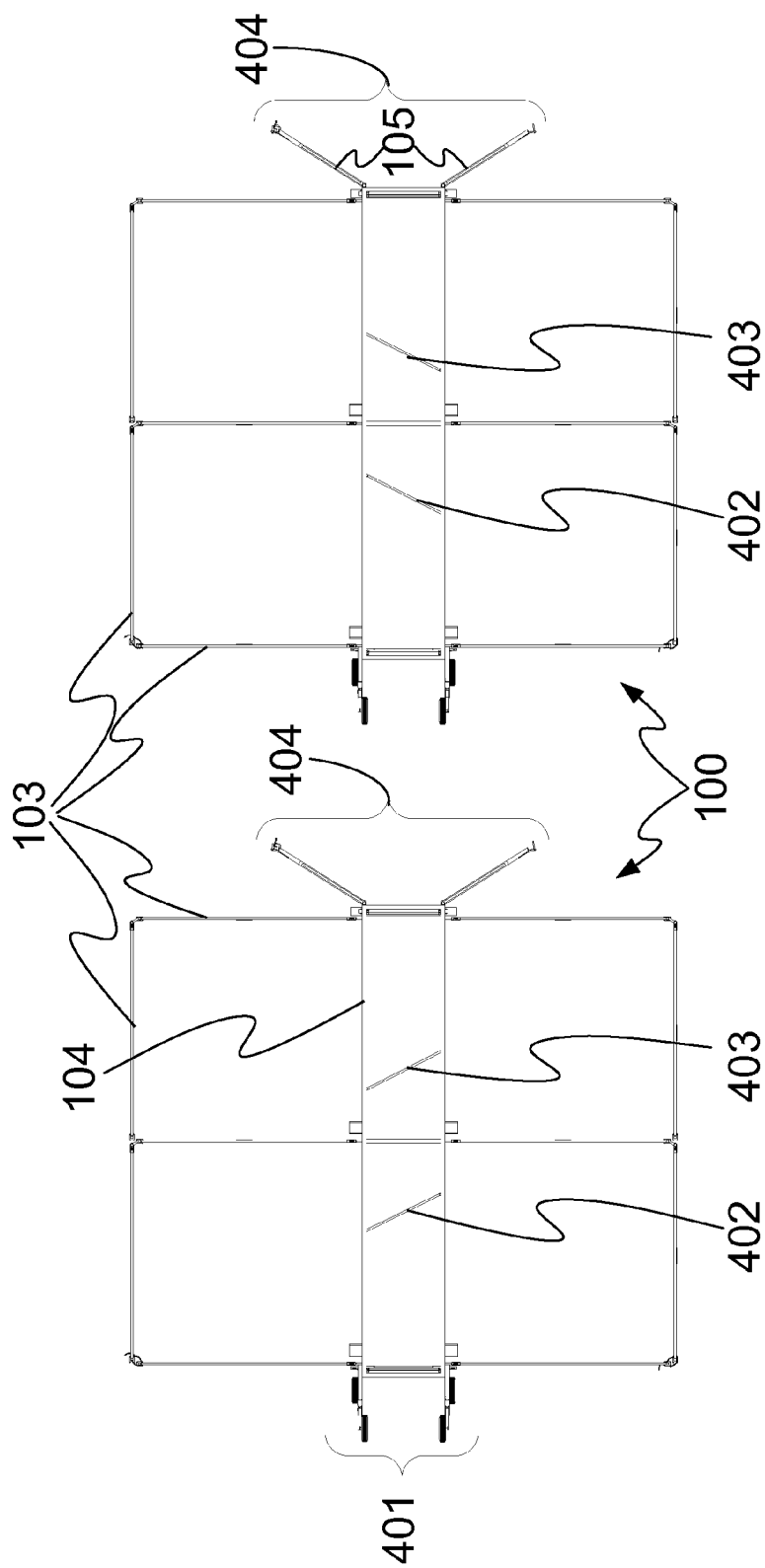
FIG. 4A is a top view an embodiment of the Portable Corral in the expanded orientation showing how the sorting alleyway gates can be used to direct livestock from a selected sub-corral to another sub-corral.
FIG. 4B is a top view an embodiment of the Portable Corral in the expanded orientation showing how a different configuration of the sorting alleyway gates can be used to direct livestock from a selected sub-corral to another sub-corral.

FIG. 4 shows the portable corral in the expanded orientation showing the entrance chute 401, the central chute 104, the left foldable corral 107, and the right foldable corral 108 in the expanded configuration. In an embodiment of the portable corral the gate panels can be configured to allow a variety of orientations in order to sort livestock into a specific sub corral areas. The sorting process is performed by simply opening and closing the appropriate sort gates and gate openings to the sub-corral areas to allow the livestock to move into the appropriate areas as shown in FIG. 3. FIG. 4 illustrates how the rear sorting panel 403 and front sorting panel 404 can be oriented to allow various configurations of sorting of the livestock.

FIG. 5 shows how the left breakaway hitch section and right breakaway hitch section are joined to form the breakaway hitch that is connected to the towing vehicle. The breakaway hitch pins are placed through the right pin bracket through the left pin brackets and the pins are secured onto the breakaway hitch. This connection is also further illustrated in FIG. 6 showing the left and right section of the breakaway hitch coming together and being secured. The receiver hitch is comprised of an adjustable pin mechanism that allows for adjustment of the receiver hitch to accommodate hitch heights of various towing vehicles.

FIG. 9b shows how the portable corral can be placed in the towing configuration with the rear lifting cylinders 803 at the rear chute location. Pneumatic or hydraulic pistons located on either side of the rear chute can be engaged to lift the entire portable corral off the ground placing the weight of the portable corral on the two rear tires. With the hitch in the transportation orientation and attached with towing vehicle the portable corral can then be towed away to a new location. In one embodiment of the Portable Corral, the lifting the rear of unit is done by two rear lifting cylinders 803 that are 3" in diameter and 20" long. Spindle welded to ¾×6" flat bar on bottom at a 45 degree angle. This will let the unit be raised 12" off of the ground for transporting.

In a best mode of operation of the embodiments, to deploy the embodiments from a towing configuration, the front lift 102 is first extended so the towing vehicle can be unhitched. Then the rear lifting cylinders 803 and the front lift 102 are retracted allowing the embodiments to rest on the ground. Then, the rear chute is unfolded to allow for livestock to be channeled into the embodiments. The breakaway hitch is unfolded to allow for an exit chute for the livestock. The left and right foldable corrals are unfolded and deployed as the livestock sorting application requires.

What is claimed is:

1. A portable corral comprised of an entrance chute, a rear-wheel assembly with two sides, a left side and a right side, a central chute, a left foldable corral, a right foldable corral, a breakaway hitch, an under-slung torsion tube, a front chute, and an exit chute; wherein the rear-wheel assembly with two sides is comprised of the under-slung torsion tube wherein the under-slung torsion tube is comprised of a steel tube that is attached to a wheel frame on each side of the rear wheel assembly; wherein the wheel frame is in turn attached to one or more rubber wheels on each side of the wheel frame; wherein the under-slung torsion tube serves to provide a mechanical connection and mechanical communication between the two sides of the rear wheel assembly; wherein the under-slung torsion tube serves to maintain stability of the portable corral as the portable corral is transported over rough terrain; wherein the entrance chute is comprised of two or more fence panels attached to a rear of the central chute; wherein the fence panels are rectangular panels constructed from tubular steel or sheet steel members that form a single fence unit or fence panel constructed so that livestock cannot walk or crawl through opening of the two or more fence panels; wherein the central chute is comprised of a central chute frame, four main corner horizontal structural beams, four main corner vertical structural beams, a plurality of horizontal, vertical and diagonal support members, a plurality of alleyway gates, a pair of rear lifting cylinders, a front lift, a hydraulic pump, a solar panel, a battery, and a second plurality of fence panels; wherein the central chute acts as a main structural and support assembly when the portable corral is being transported; and wherein the central chute serves as a central livestock herding corridor when the portable corral is in the deployed mode.

2. The portable corral described in claim 1 wherein the front chute is comprised of the breakaway hitch which is comprised of a left breakaway hitch section and a right breakaway hitch section,
   a. wherein the left and right breakaway hitch sections are collapsed together to comprise the breakaway hitch when the portable corral is folded in the transportation configuration,
   b. wherein the breakaway hitch is then used to connect to a towing vehicle,
   c. wherein the left breakaway hitch section and right breakaway hitch section engage to form a gooseneck-type hitch,
   d. wherein the left and right breakaway hitch sections are affixed via two bolts which are inserted through two bolt guides and secured with two nuts,
   e. wherein the left and right breakaway hitch sections are secured by two guide posts engaging with a guide plate,
   f. and wherein a left support plate and a right support plate are butted and secured against each other when the left and right breakaway hitch sections are joined and secured by the bolts and nuts.

3. The portable corral described in claim 2 wherein the left foldable corral is further comprised of two sub corral areas and the right foldable corral is further comprised of two sub-corral areas, and wherein the left foldable corral area is attached to a left central chute panel and the right foldable corral area is attached to a right chute panel, wherein the left and right foldable corral areas are further comprised of a plurality of corral panels.

4. The portable corral described in claim 3 comprising a winch which is affixed to both sub-corral areas on both the left foldable corral and right foldable corral for a total of four winches, two on the left foldable corral and two on the right foldable corral, wherein the winches are used to raise the left and right corral areas off the ground and to place the portable corral in the transportation mode.

5. The portable corral described in claim 4 wherein the corral panels of the left and right foldable corral areas are shorter than the fence panels of the entrance and central chutes to allow the plurality of corral panels to be folded.

6. The portable corral described in claim 2 wherein the plurality of alleyway gates is comprised of a rear alleyway gate and a front alleyway gate.

7. The portable corral described in claim 2 wherein the two or more fence panels of the entrance chute are comprised of four fence panels with two fence panels attached to a left side of the rear of the central chute and two panels attached to a right side of the central chute assembly wherein the fence panels are hinged so that either the right or left side can fold up and be secured to the rear of the central chute assembly.

8. A portable corral comprised of an entrance chute, a rear-wheel assembly with two sides, a left side and a right side, a central chute, a left foldable corral, a right foldable corral, a breakaway hitch, an under-slung torsion tube, a front chute, and an exit chute; wherein the rear-wheel assembly is comprised of the under-slung torsion tube wherein the under-slung torsion tube is comprised of a steel tube that is attached to a wheel frame on each side of the rear wheel assembly; wherein the wheel frame is in turn attached to the one or more rubber wheels on each side of the wheel frame; wherein the under-slung torsion tube serves to provide a mechanical connection and mechanical communication between two sides of the rear wheel assembly; wherein the under-slung torsion tube serves to maintain stability of the portable corral as the portable corral is transported over rough terrain
   a. wherein the rear wheel assembly is comprised of
      i. a plurality of rubber wheels to support the portable corral when being transported,
      ii. a pair of walking beams wherein one walking beam is positioned on a left side of the entrance chute and one walking beam is positioned on a right side of the entrance chute,
   b. wherein each walking beam is comprised of the plurality of rubber wheels wherein the plurality of rubber wheels allows for the transportation of the portable corral when the portable corral is in a transportation configuration, wherein the walking beams allow the plurality of rubber wheels to independently move over rough terrain by allowing the walking beams to pivot at a point essentially equidistant between two axels of the plurality of rubber wheels on each side of the portable corral,
   c. wherein the entrance chute is comprised of two or more fence panels attached to the rear of the central chute, wherein fence panels are rectangular panels constructed from tubular steel or sheet steel members that form a single fence unit or fence panel constructed so that livestock cannot walk or crawl through opening of the fence panel,
   d. wherein the central chute is comprised of a central chute frame, four main corner horizontal structural beams, four main corner vertical structural beams, a plurality of horizontal, vertical and diagonal support members, a plurality of alleyway gates, a pair of rear lifting cylinders, a front lift, a hydraulic pump, a solar panel, a battery, and a second plurality of fence panels wherein the central chute acts as the main structural and support assembly when the portable corral is being transported, wherein the central chute serves as the central livestock herding corridor when the portable corral is in the deployed mode.

9. The portable corral described in claim 8 wherein the front chute is comprised of the breakaway hitch which is comprised of a left breakaway hitch section and a right breakaway hitch section wherein the left and right breakaway hitch sections are collapsed together to comprise the breakaway hitch when the Portable Corral is folded in the transportation configuration wherein the breakaway hitch is then used to connect to the towing vehicle.

10. The portable corral described in claim 9 wherein the left foldable corral is further comprised of two sub corral areas and the right foldable corral is further comprised of two sub-corral areas, and wherein the left corral area is attached to a left central chute panel and the right corral area is attached to a right chute panel, wherein the left and right corral areas are further comprised of a plurality of corral panels.

11. A portable corral comprised of
    a. an entrance chute,
    b. a rear-wheel assembly
    c. a central chute,
    d. a left foldable corral,
    e. a right foldable corral,
    f. a breakaway hitch,
    g. an under-slung torsion tube, h. an exit chute,
i. wherein the rear wheel assembly is comprised of a pair of rubber wheels, one rubber wheel on a left side of the portable corral, one rubber wheel on a right side of the portable corral, where the rubber wheels are attached to a bottom of the central chute via a rear wheel support, and to an upper portion of the central chute via a rear lifting cylinder on the left side of the portable corral and a rear lifting cylinders on the right side of the portable corral;
j. wherein the entrance chute is comprised of two or more fence panels attached to the central chute, wherein the fence panels are rectangular panels constructed from tubular steel or sheet steel members that form a single fence unit or fence panel constructed so that livestock cannot walk or crawl through opening of the fence panel,
k. wherein the central chute is comprised of a central chute frame, four main corner horizontal structural beams, four main corner vertical structural beams, a plurality of horizontal, vertical and diagonal support members, a plurality of alleyway gates, a pair of rear lifting cylinders, a front lift, a hydraulic pump, a solar panel, a battery, and a plurality of fence panels wherein the central chute acts as the main structural and support assembly when the portable corral is being transported, wherein the central chute serves as the central livestock herding corridor when the portable corral is in the deployed mode.

* * * * *